United States Patent [19]
Lechner

[11] 3,811,086
[45] May 14, 1974

[54] DEVICE FOR TESTING MULTIPLE ELECTRIC CIRCUIT SELECTOR SWITCHES

[75] Inventor: Ernst-Friedrich Lechner, Erlangen, Germany

[73] Assignee: Siemens Aktiengesellschaft, Munich, Germany

[22] Filed: Aug. 24, 1972

[21] Appl. No.: 283,405

[30] Foreign Application Priority Data
Sept. 4, 1971   Germany............................ 2144414

[52] U.S. Cl............................................. 324/28 R
[51] Int. Cl............................................. G01r 31/02
[58] Field of Search................................ 324/28, 51

[56] References Cited
UNITED STATES PATENTS
2,852,736   9/1958   Spahn ........................... 324/28 R Primary Examiner—Alfred E. Smith
Attorney, Agent, or Firm—Kenyon & Kenyon Reilly' Carr & Chapin

[57] ABSTRACT

Multiple electric circuit selector switches have manually operated rotary control wheels, rotation of the wheels selecting the various circuits. When used in large numbers, each control wheel must be rotated through all its possible positions to test each position as to circuit continuity. To save labor and time, a portable assembly is used including a drive wheel adapted for releasable peripheral engagement with each switch's control wheel, the drive wheel being motor powered and the assembly including means for determining the electric continuity of the switch elements as they are successively actuated by the driven control wheel.

6 Claims, 6 Drawing Figures

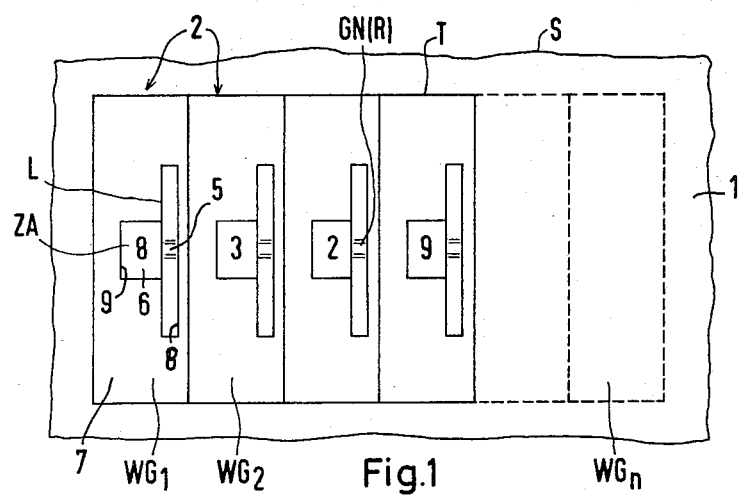
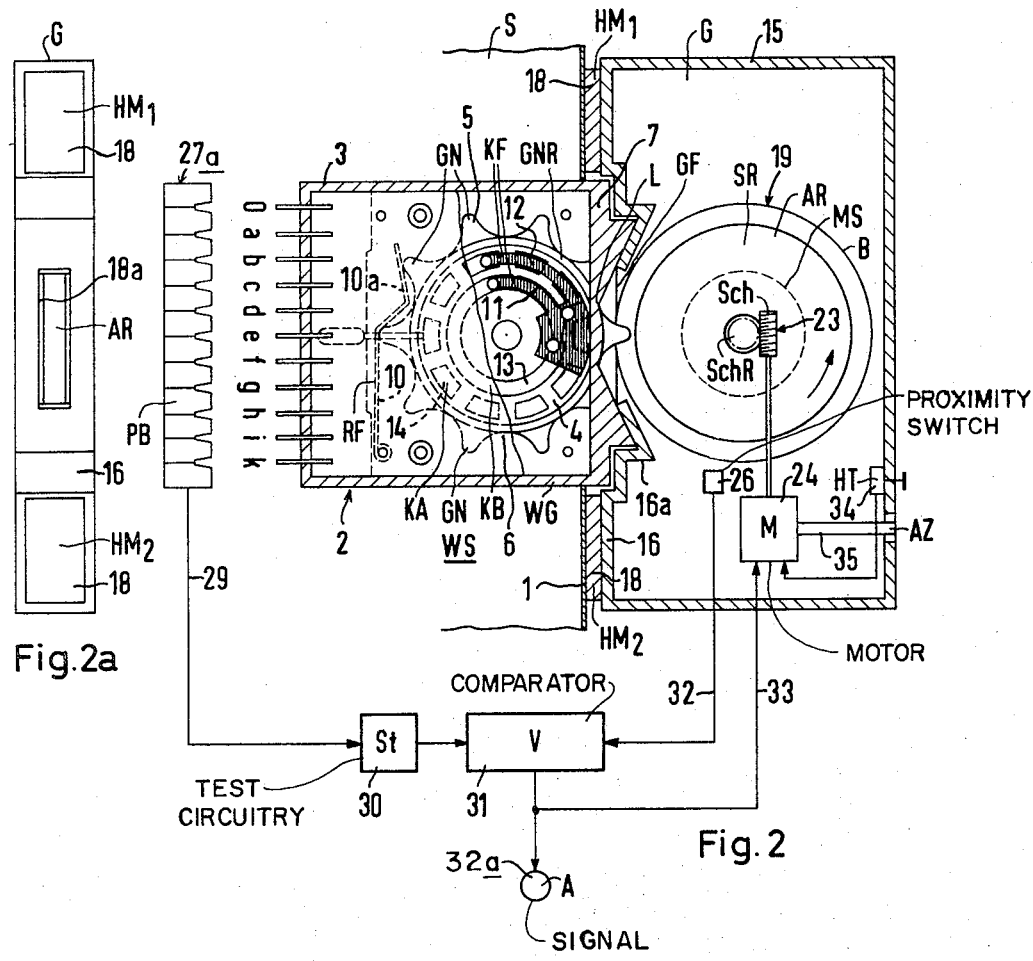

DEVICE FOR TESTING MULTIPLE ELECTRIC CIRCUIT SELECTOR SWITCHES

BACKGROUND OF THE INVENTION

Sophisticated electric controls for automated machine tools and other applications require large numbers of manually operated multiple electric circuit selector switches to properly set-up the circuitry required to perform the various functions, many of which are complicated. An example of the use of such switches is numeric decade circuit setting in numerical control circuitry. In one much-used form of switch, a panel is formed with a slot. A finger operated rotary control wheel is mounted behind the panel, a portion of the wheel's periphery projecting radially through the slot so that it is accessible for turning. This wheel selectively actuates a series of circuit makers depending on the control wheel's rotative position, the wheel having means for torque-releasably holding it at any one of these positions. The wheel is associated with a drum having its surface marked to indicate, via a window in the panel, the circuit maker being actuated.

If any one switch fails to function properly, the entire control circuitry may and usually is affected harmfully or rendered completely inoperative. Therefore, it is desirable to test each switch after the initial installation of the series or banks of switches, and if thereafter, when in service, an unknown one of the switches is suspected of malfunctioning, it its necessary to test all of the switches.

DESCRIPTION OF THE PRIOR ART

Although it is easy to imagine the irritation and unreliability involved by such testing, manual operation of each switch through its various rotative positions has been the prior practice insofar as is known. Nothing has been heretofore devised to relieve the labor and time involved by such testing, or to provide for more certain and accurate test results.

SUMMARY OF THE INVENTION

The present invention contemplates a portable device or assembly, which may be applied to the switches, one after another, easily by a workman, and including a drive wheel adapted for releasable peripheral engagement with the control wheel of each of the switches, together with a motor, either electric or spring-wound, for rotating the drive wheel to drive the switches' control wheel through its various circuit maker actuating positions, together with means for determining the electric continuity of the various circuit makers as they are successively actuated by the driven control wheel.

At least the drive wheel and the motor may be housed in a portable housing having a front panel conforming to the shape of the switches' panel, and having a slot through which a portion of the periphery of the drive wheel projects, and preferably some means for releasably securing this housing to the switches' panel, such as by the use of permanent magnets, suction cups or the like. Preferably the assembly includes means for signaling and stopping the motor automatically in response to a failure in the electric continuity of any circuit maker as it is actuated by the driven control wheel. Also, a means may be provided for automatically stopping the motor after the drive wheel has driven the control wheel so that that latter has actuated all of the switches' series of circuit makers and the test is completed.

Upon operation of the signal and stopping of the drive motor, which through the drive wheel was turning the switch's control wheel, removal of the housing of the device exposes the switch's indicia marking the circuit maker causing trouble, the defective switch itself being, of course, then known.

Other details are included in the concept of this invention as may be understood from the following disclosure.

BRIEF DESCRIPTION OF THE DRAWINGS

The accompanying drawings are very largely schematic with all details eliminated which are not required to disclose the principles of the invention. In these drawings the various figures are as follows:

FIG. 1 is a front view of a bank of the switches previously referred to, it being understood that this view shows only a very small number of switches relative to the number required to set up complicated control circuitry;

FIG. 2 is a longitudinal section taken through one of the switches and in the same manner illustrating an example of a testing device of the present invention as it appears when in use, the left-hand side of the switch being in elevation;

FIG. 2a is a front view of the testing device showing the panel with the slot through which the drive wheel periphery projects for a portion of its diameter;

DESCRIPTION OF THE PREFERRED EMBODIMENTS

Figure 3A:
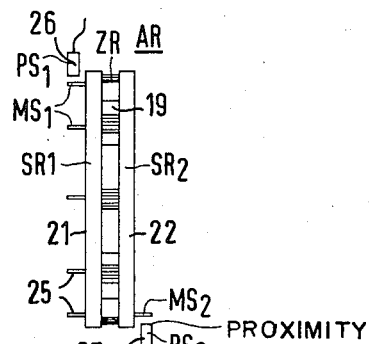
FIG. 3a is an end elevation of this drive wheel as it is incorporated in rotative assembly.

Having reference to the above drawings, FIG. 1 is a front elevation of a segment of one of the control boards 1 mounting a plurality of the switches 2 of which only four are shown but with dotted lines suggesting the greater extent of the switch system. Very often there are a very great number of switches 2 arranged side-by-side as compactly as their construction permits. During their installation or through service, the operability of these switches might be questioned, assurance of operability requiring testing of each switch.

FIG. 2 exposes the general internal construction of such switches. Each switch has a casing 3 journaling a wheel 4 having radially projecting finger knobs 5 providing the configuration of a circular series of teeth. This wheel carries with it an indicator drum 6 bearing numbers, for example, indicating the selected circuitry. The casing 3 includes a front panel 7 having a slot 8 through which a portion of the periphery of the wheel 4, including one of its finger knobs 5, project, and a window 9, seen in FIG. 1, through which the drum 6 with its indicia may be viewed. This assembly being a decade switch, it has ten of the finger knobs or teeth 5, a detent spring 10 within the casing 3 serving to hold the wheel 4 and its drum 6 in a torque-releasable manner with one of its finger knobs 5 projecting through the slot 8 with the appropriate indicia registering with the window 9. Thus, by using finger pressure on the exposed knob, the wheel 4 may be turned in a step-by-step manner with the wheel 4 and its successive finger knobs snapping into oriented positions.

Arcuate spring contactors 11 and 12 are mounted inside of the casing 3 in an electrically insulated manner, these two contactors being electrically interconnected. The contactor 11 rides on a continuous electrically conductive circular contact 13 carried by the wheel 4 and which, although not shown, connects with the first of a series of electric connector pins electrically insulatingly extending through the back of the casing 3, this being the pin marked O in the drawings, the balance of the pins being marked A through K in this FIG. 2. The other contactor 12 successively engages each of ten contact segments 14, also carried by the wheel 4, each electrically connected with one after another of the pins A through K, again by means not shown.

It is to be understood that the switch described above is a commercially available switch. Each time the wheel 4 which carries the contacts 13 and 14 is snapped or stepped from one position to another, the pin O is correspondingly electrically connected with the pins A through K, the electrical connection being such that the pins are connected in succession as the wheel is successively turned to its different positions established by the spring 10 with, of course, the indicia on the drum 6 exposed through the window 9 indicating the circuit selected. The spring 10 has a bent portion 10a which rises and falls between the knobs 5 during rotation of the wheel 4, providing the snap action described above. Although not shown, it is also to be understood that after the switch is installed, a female electric connector plug having sockets corresponding to the switch's connector pins is plugged on the latter, this plug being provided with a suitable multi-conductor cable.

It can be seen that installations involving a large number of these switches makes their manual testing laborious, time-consuming and possibly results in uncertainties requiring retesting. Without some suitable tool, the above-mentioned plug must be removed, and each switch finger operated through its 10 possible positions while the continuity of the circuits between the pin O and each of the pins in the alphabetical series is tested.

The device or tool of the present invention is also illustrated by FIG. 2. It comprises a casing 15 having a front panel 16 suitably contoured as necessary, as at 16a, to fit snugly against the panel 7 of any one of the switches involved, the latter ordinarily having the same panel configuration throughout the series or banks of the switches. The casing panels 16 may be made of non-magnetic material and permanent magnets 18 may be fixed thereto for securing the housing 15 releasably to the switch board 1 in which the switches are mounted, these boards normally being made of steel.

Figure 3:
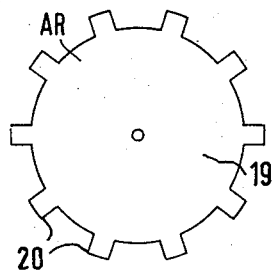
FIG. 3 in elevation shows the device's drive wheel.

The panel 16 has a slot 18a which registers with the slot 8 of the switch 2, and the casing 15 journals a wheel 19 comprising an assembly shown by FIGS. 3 and 3a. As there illustrated, the wheel 19 has teeth 20 defining intervening spaces corresponding in number to the finger knobs or teeth 5 so that two of the teeth 20 can straddle any one of the switch's finger knobs 5. To maintain lateral registration, the wheel 19 is sandwiched between two wheels 21 and 22 having outer peripheries extending slightly beyond the outer tips of the wheel 20 and spaced to encompass the sides of the knobs 5. This wheel 19 is rotatively driven as presently explained, the two wheels 21 and 22 also having the advantage of avoiding the possibility of injury to a workman if the wheel 19 inadvertently is rotatively driven while the new device is removed from a switch.

This driving of the wheel 19 is effected through reduction gearing 23 by a motor 24 which may be of the stepping type. If so, it intermittently drives the wheel 19, with each rotative step sufficient to snap the switch's wheel 4 from one of its switching positions to another. Any controllable motor that is suitable may be used, a mechanical spring motor, possibly having a suitable escapement mechanism being a suggestion, if provided with electrical controls.

The wheel 21 is provided with a series of axially projecting pins 25, corresponding in number to the described switching positions of the wheel 4 of the switch 2, and as the wheel 21 rotates with the wheel 19, these pins sweep past an electric proximity switch 26. A proximity switch is used here so that it will be actuated to produce a signal whenever one of the pins 25 is near it, so that even though there is circumferential looseness in the driving connection between the teeth 20 of the wheel 19 and the finger knobs 5 of the wheel 4, a signal will be obtained each time the wheel 19 flips the wheel 4 to a next successive switching position. Another proximity switch 27 is mounted for actuation by a single pin 28 carried by the wheel 22 which, of course, also turns with the toothed wheel 19 of the new device.

As so far described, it is apparent that when the motor 24 is started, the wheel 19 is turned so as to flip the switch wheel 4 intermittently through all of its 10 possible positions; that as to each position a signal can be obtained via the proximity switch 26, the pins 25 being properly oriented for this purpose, and that for each single complete rotation of the wheel 19 a signal can be obtained from the proximity switch 25. The manner in which these signals are put to use will now be described below.

Referring again to FIG. 2, a multi-socket female plug 27a fitting the switch's terminal pins previously referred to, is shown as about to be applied to the latter. The socket fitting the pin O establishes a circuit including the contactor 11 and its contact ring 13, the contactor 12 and each one of the contact's segments 14 registered therewith, and back to the one of the pins A through K with which this segment connects. This circuit may be used to measure the circuit continuity thus established in each instance, the plug 27a connecting via an appropriate multi-conductor cable 29 with test circuitry 30. The latter either by measuring the resistivity of the circuit, any voltage drop that may exist, or the like, may be constructed in a conventional manner to produce a signal when the involved contactor and contact is in good working order, this signal being transmitted to a suitable comparator 31. As the wheel 4 is rotated step-by-step through the medium of the wheel 19 there may be momentary harmless circuit discontinuities resulting from the contactor 12 spanning between two of the segments 14. Therefore, the signals obtained from the proximity switch 26 are sent via an appropriate cable 32 to the comparator 31, the latter actuating only when receiving a signal from this switch 26. If the signal obtained from whichever circuit of the switch 2 is involved compares appropriately with the signal obtained from the switch 26, the motor 24 operates and the wheel 19 flips the wheel 4 to its next position. If the signal obtained from that pin indicates a faulty electrical transmission between that segment and the contactors, the comparator 31 may, by conventional design, be made to produce a signal operating an indicator 32a such as a light signal or audible alarm. Furthermore, this signal is fed through a cable 33 to the motor 24 which is provided with an electrical control (not shown) stopping the motor.

When the motor 24 is stopped and the signal 32a is operating the workman only has to remove the test device by pulling it off, this leaving the indicia on the drum 6 of that switch displayed through the window 9 to indicate first that that particular switch has a defect, and secondly, that the defect exists in the contact segment marked by the displayed indicia. This permits not only removal of the defective switch and the reinstallation of a good switch, but also where the defect is located in the removed switch. The switch may be fixed either on the spot and reinstalled, or sent to the shop for repairs.

The motor 24 may be provided with a starting switch 34 which when operated starts the motor 24 and lets it run through one complete cycle, or in other words, one revolution of the wheel 19, the proximity switch 27 stopping the motor 24 after this revolution. The controls for the motor 24 may be entirely conventional and are therefore not shown. If the motor 24 is a spring-wound mechanical motor, it may be wound with a key by way of a stem indicated at 35. A spring motor would be indicated when the extreme light weight and portability are requirements, the housing 15 then containing miniaturized circuitry and a self-powering battery for the test circuitry and which would in addition be used for electromagnetic controls for such a mechanical spring motor.

Figure 4:
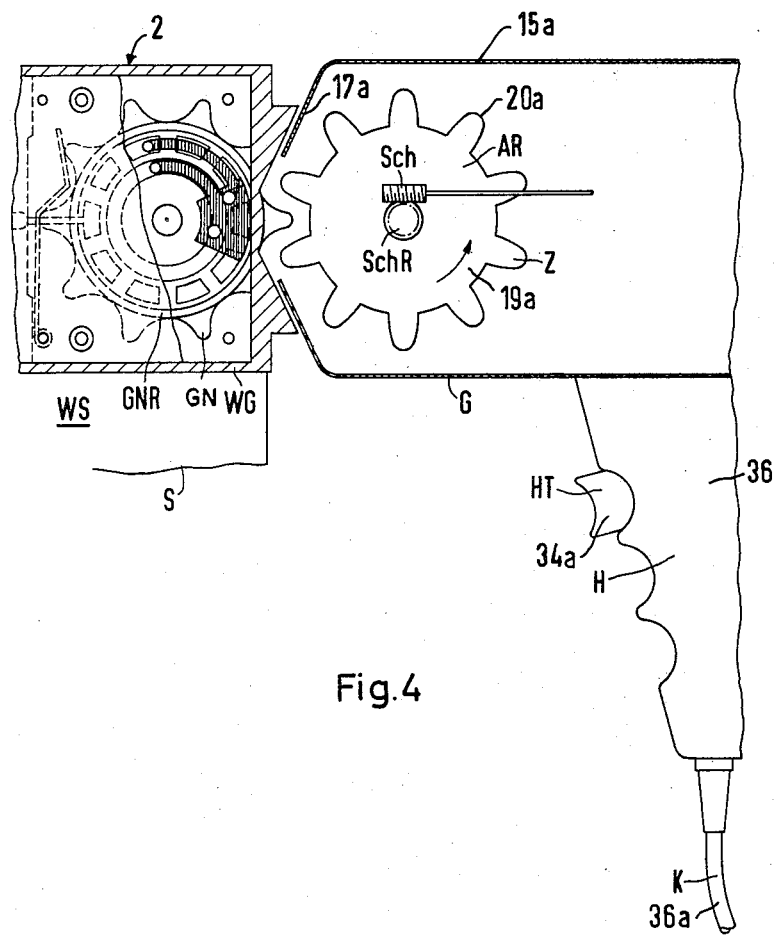
FIG. 4 is a longitudinal section of a modification of the construction shown by FIG. 2 and suggesting how substantially all of the parts can be incorporated as an easily manipulated hand-held tool.

For more rough-and-ready use, this testing device may be housed as indicated by FIG. 4 where the housing 15a is associates with a piston grip 36, the starting switch 34a being in the form of a trigger and the housing 15a having a front nose piece 17a fitting the contoured panel of the switch 2. With the device in this form the workman need only to press it against the switch under test and pull the trigger. In this instance the reduction gearing 23 might have a gear ratio causing relatively rapid rotation of the switch wheel 4. In the case of the form shown by FIG. 2, the gear ratio might be such as to produce a slow switch wheel rotation, such as 1 rpm, since the device does not need to be hand-held and slower rotation more closely simulates the manual switching operation involved during the normal operation of the switch.

Incidentally, FIG. 4 serves to show a drive wheel 19a having teeth 20a which are more rounded than in the case of FIG. 3. In other words, the drive wheel need only be appropriately constructed to flip the switch wheel step-by-step through its various possible positions. Obviously, the two wheels 4 and 19 should have the same effective diameters. In some instances switches of the type involved here are made with knurled operating wheels, not having fingers or teeth of any kind. In such instances, although not shown, the drive wheel of the device may be made with an elastically deformable rim of suitable hardeners, preferably knurled correspondingly to the switch wheel, to permit the use of this testing device.

Referring again to the female plug 27a, it is, of course, possible to have its sockets of the pins A through K all electrically interconnected, when providing the signal through the cable 29 to the testing circuitry 20. This is because when the circuit including any one segment 14 is established, the other segments are inactive; and if the segment involved by the test at that moment shows a deficiency, no signal will be sent to the comparator 31 so that the previously described operation is effected.

It can be seen from the foregoing that a test device of the character described can be made very portable, quickly applied to or associated with one switch after another, that each switch can be run through all of its possible positions, and that if any one switch position fails to provide a satisfactory circuit continuity, conductivity, sufficiently low electrical resistance of other such characteristics, the test circuitry 30 will will detect this, will fail to transmit a signal to the comparator 31 for comparison with the signal from the proximity switch 26, the light or other indicator 32 will operate, the motor 24 will stop, and the workman conducting the test will know that something is wrong. Removal of the device exposes the switch's indicia showing exactly which position of the switch, and therefore the switch contact segment, is responsible for the failure. The device may be made quite rugged and the circuitry involved may be enclosed in the housing containing the motor and drive wheel along with the necessary motor control elements such as relays and the like, with only a power cable, as indicated at 26a in FIG. 4, leading to the device and possible also containing the conductors for the testing multi-socket female plug 27a. Battery operation is, of course, possible.

Although it has previously been indicated that the motor 24 can be a stepping-type motor, a continuously operating motor 24 is also possible. Its defect, if any, would be that there would be no relatively long pause at the various switching positions of the wheel 4 of the switch 2. However, both the wheel 19 and the wheel 19a in FIGS. 3 and 4 respectively, are shown with relatively long spaces between their teeth 20 and 20a respectively. Therefore, with a continuously operating motor each tooth will engage one of the finger knobs and start to move it slowly until the portion 10a of the spring 10 snaps the switch wheel to its next position, this providing a period of time for the testing action until the next one of the teeth 20 or 20a come into play to again flip the wheel 4 to its next position. In the case of knurled wheel elements, the stepping motor is preferred for obvious reasons.

What is claimed is:

1. A device for testing a multiple electric circuit selector switch of the type having a manually operated rotary control wheel with a portion of its periphery projecting radially through a slot in a panel and selectively actuating a series of circuit makers depending on the control wheel's rotative positions, said wheel having means for torque releasably holding it at said positions; said device comprising a portable assembly including a drive wheel adapted for releasable peripheral engagement with said control wheel, a motor rotating said drive wheel to drive said control wheel through said positions, and means for determining the electric continuity of said circuit makers as they are successively actuated by said driven control wheel.

2. The device of claim 1 including means for stopping said motor automatically in response to a failure in said electric continuity.

3. The device of claim 1 including means for automatically stopping said motor after said drive wheel has driven said control wheel so that the latter has actuated all of said series of circuit makers.

4. The device of claim 1 in which said determining means comprises said drive wheel rotatively engaging said control wheel having means for producing a comparison signal as it rotates to positions corresponding to the circuit making positions of the control wheel, means for producing a signal through each of said circuit makers, and means for comparing said signals.

5. The device of claim 1 in which said assembly includes a portable housing having a panel fitting said switch's panel, said drive wheel and its motor being mounted in said housing and the latter's panel having a slot through which a portion of said drive wheel projects for the engagement with said control wheel.

6. The device of claim 1 in which said motor is a stepping motor that intermittently rotates said drive wheel so it turns said control wheel from each of its circuit maker actuating positions to the next.

* * * * *